United States Patent Office 3,212,643
Patented Oct. 19, 1965

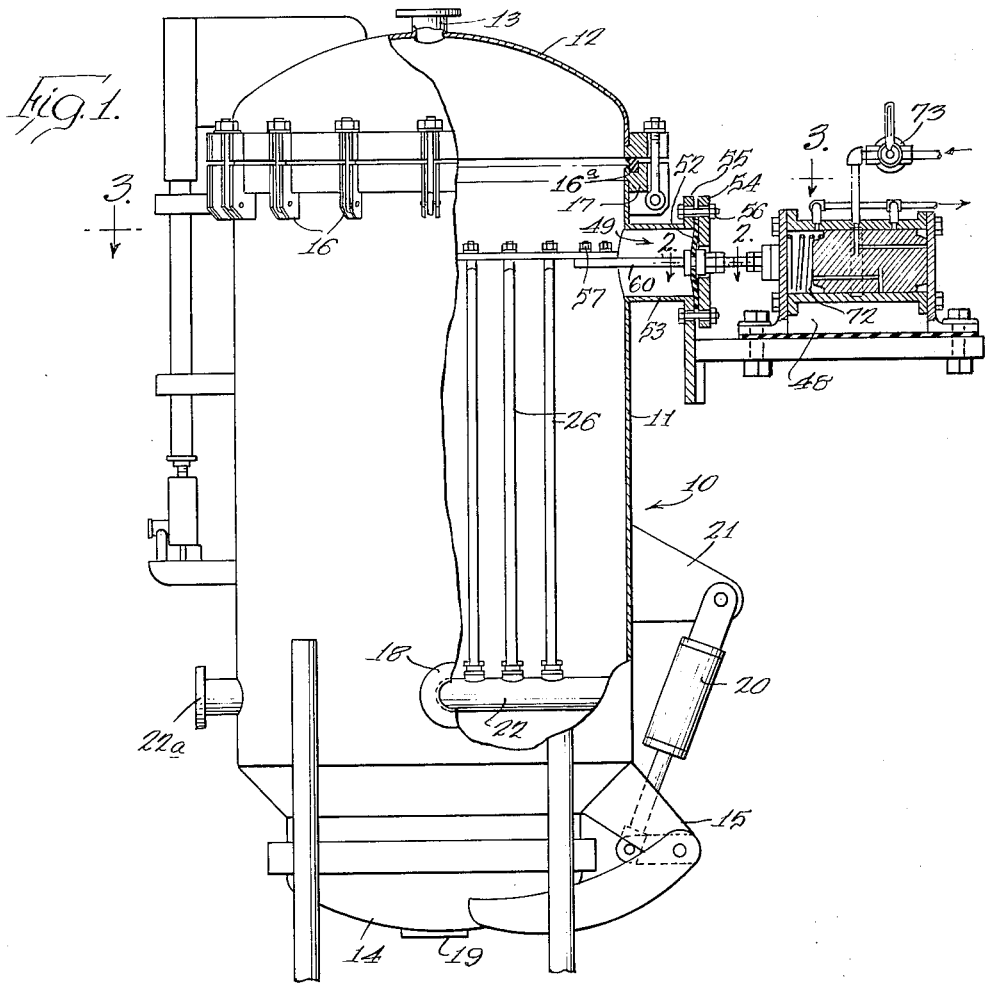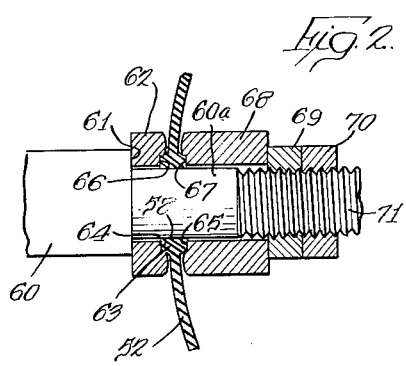

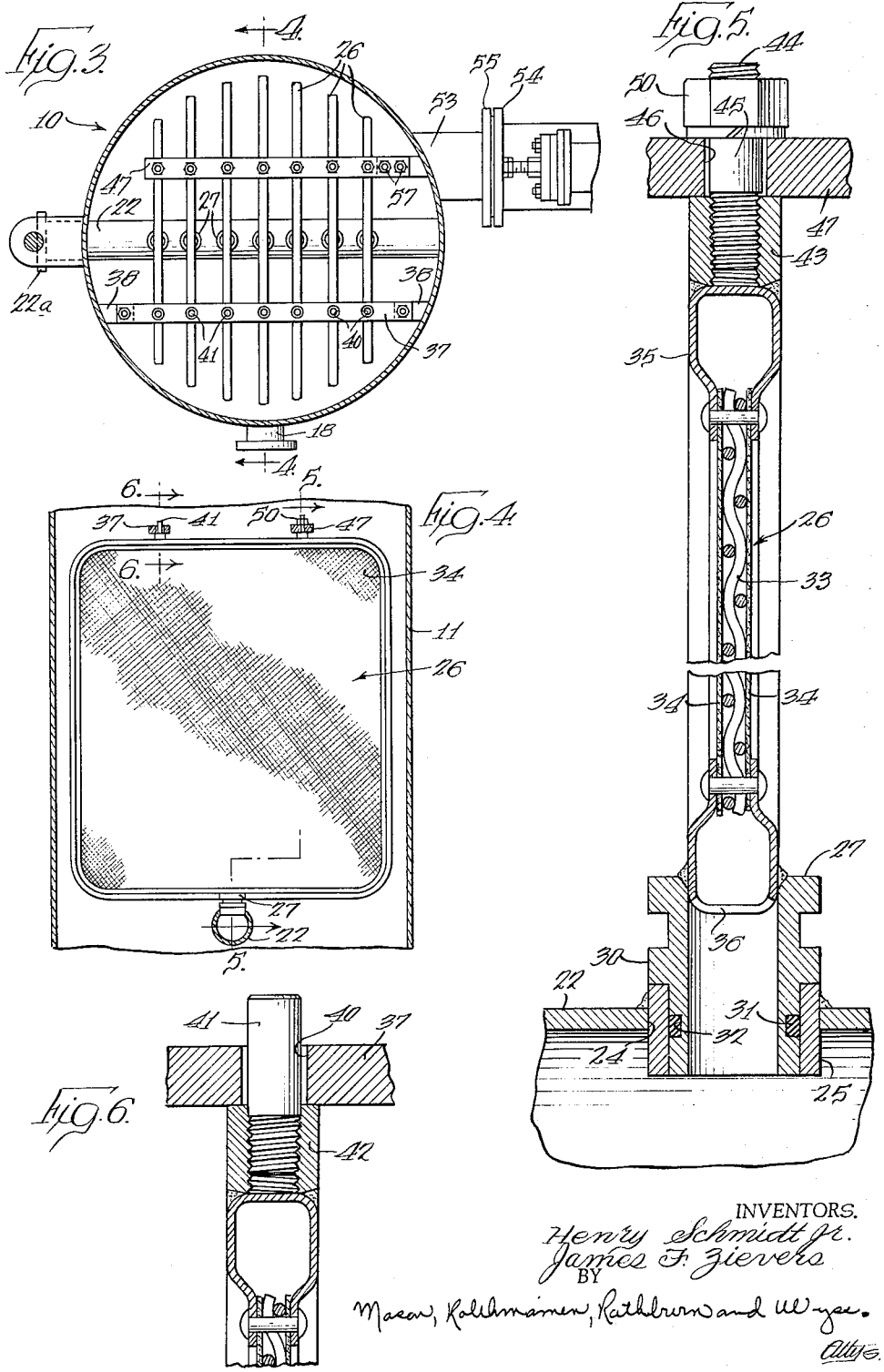

3,212,643
FILTERING APPARATUS
Henry Schmidt, Jr., Hinsdale, and James F. Zievers,
La Grange, Ill.
Continuation of application Ser. No. 13,657, Mar. 8, 1960, which is a continuation of application Ser. No. 640,814, Feb. 18, 1957. This application Aug. 31, 1962, Ser. No. 222,258
4 Claims. (Cl. 210—332)

This application is a continuation of our copending application Serial No. 13,657 filed March 8, 1960, and now abandoned, and said Serial No. 13,657 is a continuation of our application Serial No. 640,814 filed February 18, 1957, and now abandoned.

The present invention relates to filtering apparatus and more particularly to apparatus for removing a filter cake from hollow filter leaves.

Filtering apparatus of the type with which the present invention is primarily concerned generally comprises a plurality of spatially arranged, hollow filter leaves which are connected to a common outlet manifold. The leaves, which are perforated, are supported within a hermetically sealed tank and the liquid to be filtered is pumped into the tank under pressure. As the liquid passes through the leaves into the outlet manifold, the particles to be removed from the liquid are forced against the filter leaves or against a porous precoat layer previously built up thereon, and being too large to penetrate the precoat layers and/or the leaves themselves the particles are deposited on the perforate faces of the filter leaves. The particles which are thus removed from the liquid form a porous filter cake which must be removed from the leaves when ti becomes sufficiently thick to interfere with the efficient operation of the filter.

Inasmuch as the effluent passes through the cake during actual use of the filter, when the filtering apparatus is initially shut down for cleaning, the cake is moist or wet and can be removed by spraying a liquid stream against the cake or by reversing the flow of liquid through the chamber. In both instances the cake is broken up and suspended in a liquid before it is discharged from the chamber. This is called a wet discharge cake removal. In many situations, such, for example, as where the cake is highly toxic, it is desirable if not necessary to remove it from the tank in a relatively dry state. This is called a dry cake discharge.

In order to perform a dry cake discharge type of cleaning, the usual practice is to remove the filter leaves from the chamber and to use scrapers to peel the cake from the leaves. In some instances this method is practiced without first removing the leaves from the chamber. This method suffers from the disadvantage that the leaves are frequently damaged by the scrapers or part of the cake is forced into the perforations of the leaves to cause blind spots, and the cleaning personnel are subjected to the particles of cake which are removed. Thus, where such particles are toxic, the cake removal operation is both tedious and dangerous. Therefore, it would be desirable to provide apparatus for removing a dry cake from the filter leaves while they remain in the filter chamber. Although apparatus for pivotally oscillating the filter leaves in the chamber to remove the filter cake therefrom has been utilized in the past, it has not proven to be altogether satisfactory in the case of a wet cake discharge and has proven to be definitely unsatisfactory for a dry cake discharge.

Therefore, an object of the present invention is to provide a new and improved filtering apparatus which includes means for removing a dry filter cake from the filter leaves while the leaves remain mounted within the chamber.

Another object of the present invention is to provide a new and improved filter including filter leaf cleaning apparatus, which filter is suitable for use with highly corrosive liquids at relatively high pressures.

A further object of the present invention is to provide a new and improved seal for connecting an impactor mechanism to a pressurized chamber.

Very briefly, the above and further objects are realized in accordance with the present invention by providing filtering apparatus which includes a plurality of hollow filter leaves spatially disposed within a filter chamber and fixedly connected to a high speed reciprocatory impactor.

In accordance with another aspect of the present invention an improved sealing gasket and associated structure are provided to permit a direct connection between the filter leaves and an impactor mounted externally of the pressure chamber.

The invention, both as to its organization and method of operation, together with further objects and advantages thereof, will best be understood by reference to the following detailed description taken in connection with the accompanying drawings, in which:

FIG. 1 is a side elevational view partly in section of a filtering apparatus embodying the present invention;

FIG. 2 is a sectional view of a portion of the apparatus of FIG. 1 taken along the line 2—2 thereof;

FIG. 3 is a sectional view of a portion of the apparatus of FIG. 1 taken along the line 3—3 thereof;

FIG. 4 is a sectional view taken along the line 4—4 of FIG. 3;

FIG. 5 is a cross-sectional view of one of the filter leaves taken along the line 5—5 of FIG. 3; and FIG. 6 is a fragmentary sectional view taken along the line 6—6 of FIG. 2.

Refer now to the drawings and particularly to FIG. 1 thereof, wherein is shown a filter tank 10 comprising a cylindrical housing 11 over the top of which is provided a cover 12 having a centrally disposed vent 13. The bottom of the housing 11 is closed by means of a bottom cover 14 which is pivotally attached to the housing 11 by means of a hinge 15. Since the filter is operated at relatively high pressures, the top and bottom covers 12 and 14 include means such, for example, as sealing gaskets 16a (only visible at the top) for effecting a tight seal between the covers and the housing 11. During normal operation of the filter, including periodic cleansing thereof, the cover 12 remains secured to the housing 11 and, therefore, may be clamped in place by means of a plurality of suitable clamps 16 which are attached to the cover 12 and engage the lower edge of an annular flange 17 on the top of the housing 11. An inlet duct 18 is provided in the side of the tank 10 for admitting the liquid to be filtered into the chamber and a drain duct 19 is provided in the cover 14. When a dry cake discharge is used to clean the filter, the bottom cover 14 is moved out of engagement with the housing 11 by means of a pneumatically or hydraulically operated cylinder 20 which is operatively connected between the hinge 15 and a bracket 21 which is affixed to and extends from the outer wall of the housing 11.

As best shown in FIGS. 1 and 3, a plurality of hollow filter leaves 26 are arranged in spaced apart parallel planes within the tank 10 and respectively include tubular connectors 27 which depend into suitable apertures 24 provided along the top of an outlet manifold 22. A liquid tight seal is provided between the manifold 22 and the connectors 27 by means of bushings 25 which extend through the apertures 24 and are welded to the manifold 22 and an annular sealing gasket 31 which is disposed within an annular groove 32 in the outer wall of the connector 27. Shoulders 30, which are provided on each of the connectors 27 above the grooves 32, engage the upper edges of the bushings 25 and thus support the filter leaves 26 at an elevated position within the chamber. The manifold 22 extends diametrically across the chamber near the bottom thereof and includes a portion 22a which protrudes from the tank 10 and is suitably sealed thereto as by welding.

The filter leaves 26 are essentially of a type well known in the art and respectively comprise a continuous tubular frame 35 in which is clamped two fine wire or fabric screens 34 and a coarse wire screen or grid 33 which spaces the screens 34 apart. The connectors 27 are welded to the central portion of the bottom of the frames 35 of their respective filters and the frames 35 are provided with apertures 36 which connect the spaces between the screens 34 with the manifold 22 through the connectors 27. Liquid which is pumped into the filter chamber may thus pass through the screens 34 and into the manifold 22 for delivery to a location outside the filter.

In order to maintain the filter leaves 26 in spaced apart vertical planes, they are each attached at the top to a horizontally disposed guide bar 37 which extends across the chamber and is secured at its end to the tank 10 by any suitable means. However, in order to permit facile removal and replacement of the leaves 26, in the illustrated embodiment of the invention, the bar 37 is attached at its ends, by means of bolts, to a pair of brackets 38 which are welded to the inner wall of the tank 10. As shown, the bar 37 is mounted parallel with the manifold 22 toward one side of the chamber and includes a plurality of vertically extending apertures 40 which are centrally spaced apart by distances equal to the center spacing between the apertures 24. Each of the leaves 26 includes an upstanding stud 41 which loosely extends through its associated aperture 40, and as best shown in FIG. 6, the studs 41 are threaded into the threaded bore of the respective connector and spacer bushings 42 which are welded to the upper cross frames 35. The leaves 26 are maintained in substantially parallel planes by means of an impactor bar 47 which is substantially parallel to the bar 37 and is fixedly attached to each of the leaves 26. As is described in greater detail hereinafter, the bar 47 primarily functions to directly connect the leaves 26 to a reciprocatory impactor. Therefore, in order to connect the bar 47 to the leaves 26, a plurality of threaded bushings 43 are respectively welded to the top cross members of the leaves 26 and connectors 44 are threaded into the bushings 43. Both ends of the connectors 44 are threaded and the unthreaded central sections 45 thereof are positioned within apertures 46 provided in the bar 47 and nut and lock washer assemblies 50 fixedly secure the studs 44 to the bar 47. During removal of the filter cake from the leaves 26, the bar 47 is reciprocally impacted along its principal longitudinal axis by means of a reciprocatory impactor means or vibrator 48 which is mounted on shock absorbers shown schematically as a resilient sheet on a suitable platform mounted on the outside of the tank 10 and is connected to the bar 47 by means of a connector assembly 49 mounted in the wall of the tank 10.

The connector 49 must operate under extreme conditions of operation which includes using the filter 10 in conjunction with highly corrosive liquids, operating the filter at relatively high pressures, and operating the impactor 48 at a frequency of between 2500 and 4000 cycles per minute. Consequently, such conventional sealing devices as stuffing boxes are unsuited for use with the connector 49.

In accordance with the present invention a seal is provided through which reciprocatory impacts may be transmitted and which is relatively unsusceptible to the various types of corrosive liquids which may be supplied to the filter 10. Accordingly, the connector 49 includes a diaphragm type sealing gasket 52, formed of rubber or other suitable flexible material, which is mounted over the end of a tubular connector 53 which surrounds an aperture in the wall of the tank 10. As shown, the aperture is in axial alignment with the bar 47.

The disk-like gasket 52 is shown, in FIGS. 1 and 2, in a deformed condition, its normally released position, however, being substantially planar. The outer diameter of the gasket 52 is substantially greater than the internal diameter of the tube 53 and is pressed against an annular flange 55 on the tube 53 by means of a circular back-up plate 54. Where necessary, the gasket 52 may be provided with one or more annular ribs (not shown) which engage the faces of either or both of the flanges 55 and the plate 54. In assembling the unit, the gasket 52 is compressed between the flange 55 and the plate 54 by means of a plurality of bolts 56 which are outwardly displaced from the periphery of the gasket 52. In this manner, apertures or other strain creating irregularities need not be provided in the gasket 52 in order to permit mounting thereof.

The bar 47 is axially aligned and fixedly secured by means of a plurality of bolts 57 to a rod 60 which extends through a central aperture 58 in the gasket 52 and is connected externally of the tank 10 to the impactor 48. Referring to FIG. 2, it may be seen that the rod 60 is provided with a circular outer end 60a of reduced cross section terminating in a shoulder 61 against which a washer-like bushing 62 abuts. The thickness of the hub 63 of the gasket 52 is enlarged to provide a pair of annular beads 64 and 65, the bead 64 being partially received in an annular recess 66 in the bushing 62 and the bead 65 being partially received in a similar annular recess 67 in a bushing 68, the bushing 68 being slidably positioned over the portion 60a of the rod 60. A pair of nuts 69 and 70 threadedly engage a threaded portion 71 of the bar 60 and are used for compressing the hub 63 between the bushings 62 and 68 and for locking the bushings 62 and 68 in this position. Since it is particularly important that the sealing gasket 52 not be strained during installation thereof, or during the cleaning operation, when it is rapidly flexed back and forth, the hub 63 is appreciably thicker in cross section than the remainder of the diaphragm 52 and the thickness of each of the beads 64 and 65 exceeds the depth of the recesses 66 and 67. Therefore, as the bushings 62 and 68 are pressed toward one another by rotation of the nut 69 on the rod 60, only the hub 63 is compressed, the body portion of the gasket 52 remaining unstressed. In this manner the hub 63 is compressed against the rod 60 to effect a good pressure tight seal and no strain whatsoever is established in the body portion of the gasket 52. Therefore, the life and reliability of the gasket 52 are not impaired.

The outwardly extending end of the rod 60 may be attached by any suitable means to the frame of the vibrator 48 in axial alignment with the piston thereof since there is no sealing problem on the outside of the gasket 52.

The impactor 48 is of the floating piston type, sometimes called a vibrator, in which the piston is biased in one direction by a spring 72, and the bar 60 is attached, as by welding, to the adjacent face of the impactor 48. Since such impactors are well known in the art and commercially available, the impactor 48 is not described in detail. It should be understood, however, that as air is supplied thereto under pressure, the piston reciprocates within the cylinder and strikes the ends thereof while traveling at its maximum speed. In this manner reciprocatory impacts of great force and frequency are applied to the filter leaves 26. The filter leaves 26, the bar 47, the bars 60 and the impactor 48 forms a unitary structure with the bars 47 and 60 being in alignment with the axis of reciprocatory impacting of the impactor 48 to provide a maximum transfer of the force of impact to the filter leaves 26. Therefore, as the piston of the impactor 48 reciprocates and strikes the opposite ends of its cylinder, the reciprocatory impacts are transmitted directly to the filter leaves 26 to set up vibrations therein which shake the filter cake loose from the leaves 26.

Considering now a typical cycle of operation of the filter, with the covers 12 and 14 closed and all of the lines to and from the tank 10 with the exception of the vent line 13 and the inlet duct 18 closed by suitable valves (not shown) a liquid is pumped from a slurry tank into the filter chamber through the inlet duct 18 while the vent 13 is also connected to the slurry tank. When the filter chamber has been filled so that the liquid is returning to the slurry tank through the line connected to the vent 13, a precoat powder of suitable material is added to the liquid in the slurry tank in a predetermined measured amount. The vent 13 is then closed and a connection between the outlet manifold 22 and the slurry tank is opened so that the liquid from the precoat tank with the precoat filter powder suspended therein is now pumped through the screens 34 into the manifold 22 and back to the slurry tank. The flow of the precoat liquid through the screens 34 causes the precoat powder to bridge over the fine mesh openings in the screen 34 thus causing an even cake to build up on both sides of each of the leaves 26. The precoat powder is so shaped as to effect a porous cake which includes minute openings through which the clear liquor may flow but which prevents the passage therethrough of the powder. The precoat powder size may thus be used to determine the size of the suspended solids which may be present in the filtered liquor which is pumped out through the outlet manifold 22 during the filtering cycle. When a sufficiently thick cake of precoat powder has been built up on the screens 34, the line from the inlet duct 18 to the slurry tank is closed and connected to the source of liquid to be filtered. If the manifold 22 had been connected to the slurry tank at this time it is now connected to the line in which the filtered liquor is to be supplied to a suitable reservoir or other process tank. The liquid requiring filtration is now pumped into the duct 18 and the effluent is discharged to a process or storage tank, the suspended solids in the liquid being filtered out on the outside of the precoat filtered cake. In those instances in which the suspended solids in the liquid to be filtered tend to blind the filter cake, i.e., to build up a cake which is impervious to the passage of liquid, a body of filter aid powder may be introduced with the influent in the influent tank or in the line to the duct 18. This will maintain a porous cake and prolong the filter cycle.

When the flow rate through the filter slows down to an inefficient rate which is caused by the build-up of a relatively thick filter cake on the filter leaves 26, which condition can be determined by the pressure within the filtering chamber, the filter cake must be removed. In order to do this, the supply of liquid to the chamber through the duct 18 is terminated and compressed air may then be introduced into the chamber through the vent 13 until the level of liquid in the chamber is below the bottom of the screens 34. The remaining liquid in the tank is then drained through the drain line 19 and the cover 14 is opened by means of the pneumatic cylinder 20. The flow of compressed air through the filter cake causes a sufficient drying thereof so that a dry discharge may then be effected in accordance with the teachings of this invention.

With the bottom cover 14 thus open, a suitable container is placed beneath the tank 10 and the impactor 48 is set into operation by means of a suitable control valve 73. As previously indicated, the most efficient removal of the filter cake takes place when the impactor 48 is operated at a frequency of between 2500 and 4000 cycles per minute. The bar 47 is then reciprocably impacted by means of the impactor 48 and reciprocates through an amplitude of approximately one-eighth of an inch and at the above prescribed frequency. This causes the filter leaves 26 to be impacted and vibrated so that all or at least portions thereof vibrate at their resonant frequencies or harmonies thereof to quickly remove all of the filtered cake from the screens 34. This requires only a few seconds. The cover 14 is then moved into a closed position and the filter leaves 26 are once more provided with a precoat layer as indicated above.

In the event that a wet discharge of the filter cake is required, the filter is cleaned by simply shutting off the inlet and outlet valves, operating the impactor 48 for a few seconds, and draining off the liquid from the chamber through the drain line 19. Moreover, where a dry cake discharge is used more efficient cleaning may be provided by following the dry discharge with a wet discharge, i.e., when the chamber is first filled with the liquid from the slurry tank after the dry cake discharge, the impactor 48 is set into operation for a few seconds which causes any small portions of the cake which remain on the leaves 26 to be suspended in the liquid and thereby to insure an even build-up of a filter cake on the screens 34.

The present invention thus provides a filter which includes means in the form of a reciprocatory impactor or vibrator which is isolated from the liquid to be filtered and which may be used to effect a very satisfactory removal of the filter cake either in wet or dry form. Since the impactor is isolated from the filter chamber, it may be easily inspected for normal maintenance and repair, and moreover, it need not be constructed of a corrosion resistant material. This is important because such material, if available, is exceedingly expensive.

While the invention has been described by means of particular embodiments thereof, it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. Apparatus for removing the filter cake from a plurality of pressure type hollow filter leaves each including a rigid frame and a porous filtering member secured across said frame, the combination comprising a pressure tank enclosing a filter chamber, an effluent exhaust manifold fixedly supported by said tank in said filter chamber, said leaves being secured in face-to-face relationship to said manifold with the cavities in said leaves being in communication with an outlet passageway in said manifold, a rigid, substantially straight impactor bar extending perpendicularly to the planes of said leaves and through an opening in said tank, sealing means disposed between said bar and said tank to seal off said chamber, positive acting connector means fixedly and immovably connecting the frames of each of said leaves to said impactor bar at locations remote from said manifold, means for imparting shock waves to said leaves to cause vibration of said porous filtering member, said last-named means including an impactor having a housing and an inertia element reciprocably movable therein along the axis of said impactor bar into impacting engagement with said housing, means fixedly and immovably connecting said impactor bar to said housing in substantial alignment with said inertia element, support means for said impactor, and shock absorber means mounting said impactor housing to said support, whereby said leaves, said impactor bar and said impactor constitute a unitary assemblage of fixedly and immovably interconnected parts in which said impactor is supported independently of said leaves and said leaves are adapted to be vibrated at the resonant frequency thereof to dislodge a filter cake disposed thereon.

2. The filter set forth in claim 1 wherein said impactor bar lies directly against the edges of said leaves, and said connector means comprises a threaded stud on each of said leaves extending through a respective one of a plurality of spaced-apart apertures in said impactor bar, and a plurality of nuts threadedly connected to said studs on the side of said impactor bar opposite to said leaves.

3. The filter set forth in claim 1 including a guide bar lying directly on the tops of said leaves and removably fastened to said tank to prevent movement of said leaves away from said manifold, and said guide bar and said leaves having loosely interfitting complementary portions permitting limited movement of said leaves relative to said guide bar.

4. Apparatus as set forth in claim 1 wherein a flexible, imperforate, diaphragm sealing gasket is connected between said impactor bar and said tank over said opening to maintain said chamber sealed from the atmosphere.

References Cited by the Examiner

UNITED STATES PATENTS

| | | | |
|---|---|---|---|
| 1,303,008 | 5/19 | Anderson | 55—300 |
| 2,265,762 | 12/41 | McKittrick et al. | 261—81 |
| 2,304,476 | 12/42 | Poplawski | 259—108 |
| 2,874,848 | 2/59 | Cannon et al. | 210—332 |

FOREIGN PATENTS 593,356    10/47    Great Britain.

REUBEN FRIEDMAN, *Primary Examiner.*

HERBERT L. MARTIN, *Examiner.*